United States Patent
Wu et al.

(10) Patent No.: US 10,682,688 B2
(45) Date of Patent: Jun. 16, 2020

(54) CASTING METHOD OF DOUBLE THIN SHELL MOLD CRAFT

(71) Applicants: Cheng-Kuan Wu, Tainan (TW); Chen-Hang Wu, Tainan (TW)

(72) Inventors: Cheng-Kuan Wu, Tainan (TW); Chen-Hang Wu, Tainan (TW)

(*) Notice: Subject to any disclaimer, the term of this patent is extended or adjusted under 35 U.S.C. 154(b) by 97 days.

(21) Appl. No.: 16/124,242

(22) Filed: Sep. 7, 2018

(65) Prior Publication Data
US 2020/0078857 A1 Mar. 12, 2020

(51) Int. Cl.
| | |
|---|---|
| *B22C 9/04* | (2006.01) |
| *B22C 7/02* | (2006.01) |
| *B33Y 10/00* | (2015.01) |
| *B22C 9/24* | (2006.01) |
| *B33Y 80/00* | (2015.01) |
| *B29C 64/135* | (2017.01) |
| *B29C 64/118* | (2017.01) |

(52) U.S. Cl.
CPC ................ *B22C 9/24* (2013.01); *B22C 7/02* (2013.01); *B22C 9/043* (2013.01); *B33Y 80/00* (2014.12); *B29C 64/118* (2017.08); *B29C 64/135* (2017.08); *B33Y 10/00* (2014.12)

(58) Field of Classification Search
CPC .. B22C 7/02; B22C 9/04; B22C 9/043; B22C 9/22; B22C 9/24; B33Y 10/00
See application file for complete search history.

(56) References Cited

U.S. PATENT DOCUMENTS

| | | | | |
|---|---|---|---|---|
| 2006/0065383 A1* | 3/2006 | Ortiz | ........................ | B22C 7/00 164/4.1 |
| 2013/0025810 A1* | 1/2013 | Castle | ................. | B29C 33/3807 164/15 |
| 2016/0158836 A1* | 6/2016 | Oehrlein | ................ | B22D 27/13 164/529 |
| 2016/0346831 A1* | 12/2016 | Snyder | ..................... | B22C 9/10 |

OTHER PUBLICATIONS

Lee et al., "Rapid investment casting: direct and indirect approaches via fused deposition modelling," International Journal of Advanced Manufacturing Technology, vol. 23, pp. 93-101 (Year: 2003).*

* cited by examiner

*Primary Examiner* — Kevin E Yoon
(74) *Attorney, Agent, or Firm* — Alan D. Kamrath; Karin L. Williams; Mayer & Williams PC

(57) ABSTRACT

A casting method includes constructing a 3D model to add an inner wall compensation quantity, making a thin shell mold by a 3D printing machine, individually treating the thin shell mold by smooth processing, processing the thin shell mold by multi-layer impregnation slurry or gunite to make an outer shell mold, and to form a double-layer shell mold which includes the thin shell mold and the outer shell mold, processing the double-layer shell mold by sand filling and compressing, clearing the thin shell mold by a physical or chemical process, casting the outer shell mold to form a shaped article, and post processing the shaped article by shaking and sand clearing to form a product.

5 Claims, 2 Drawing Sheets

CASTING METHOD OF DOUBLE THIN SHELL MOLD CRAFT

BACKGROUND OF THE INVENTION

1. Field of the Invention

The present invention relates to a method and, more particularly, to a casting method of a double thin shell mold craft.

2. Description of the Related Art

A conventional 3D printing method for making a shell mold is performed by a dewax casting process and primarily comprises providing a staple made of paraffin wax, making a wax mold by the staple, processing the wax mold by multi-layer impregnation slurry or gunite to make a shell mold on the outer surface of the wax mold, hardening the shell mold, and providing a dewax procedure for heating the shell mold at a predetermined temperature so that the wax mold at a solid phase is changed into a liquid which flows out of the shell mold. The conventional casting method also comprises a sintering step and a sand clearing step. Thus, fabrication of the shell mold is finished. However, the conventional dewax casting craft has complicated steps, thereby increasing the cost of fabrication. In addition, the conventional method for making a shell mold easily produces pollution during the steps of dewaxing, sintering and sand clearing. Further, the procedure for making a wax mold needs manual labor, thereby decreasing the productivity. Further, the wax mold is solid so that the shell mold is easily broken due to thermal expansion and contraction of the wax mold. Thus, the wax mold has a larger thickness of about 6-8 mm, thereby increasing the cost of production. Further, the shell mold is easily deformed or broken during the sintering process.

BRIEF SUMMARY OF THE INVENTION

In accordance with the present invention, there is provided a casting method comprising a first step of constructing a 3D (three-dimensional) model by a calculator and analyzing the 3D model by a finite element analysis to add an inner wall compensation quantity, a second step of inputting data of the 3D model calculated by the calculator into a 3D printing machine which performs a printing work on a printing material to make a thin shell mold, a third step of individually treating an outer surface of the thin shell mold by smooth processing, a fourth step of processing the thin shell mold by multi-layer impregnation slurry or gunite to make an outer shell mold, and to form a double-layer shell mold which includes the thin shell mold and the outer shell mold, a fifth step of placing the double-layer shell mold into a sand box and processing the double-layer shell mold by sand filling and compressing, a sixth step of clearing the thin shell mold of the double-layer shell mold in the sand box by a physical or chemical process, a seventh step of casting the outer shell mold of the double-layer shell mold in the sand box to form a shaped article, and an eighth step of post processing the shaped article by shaking and sand clearing to form a product.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
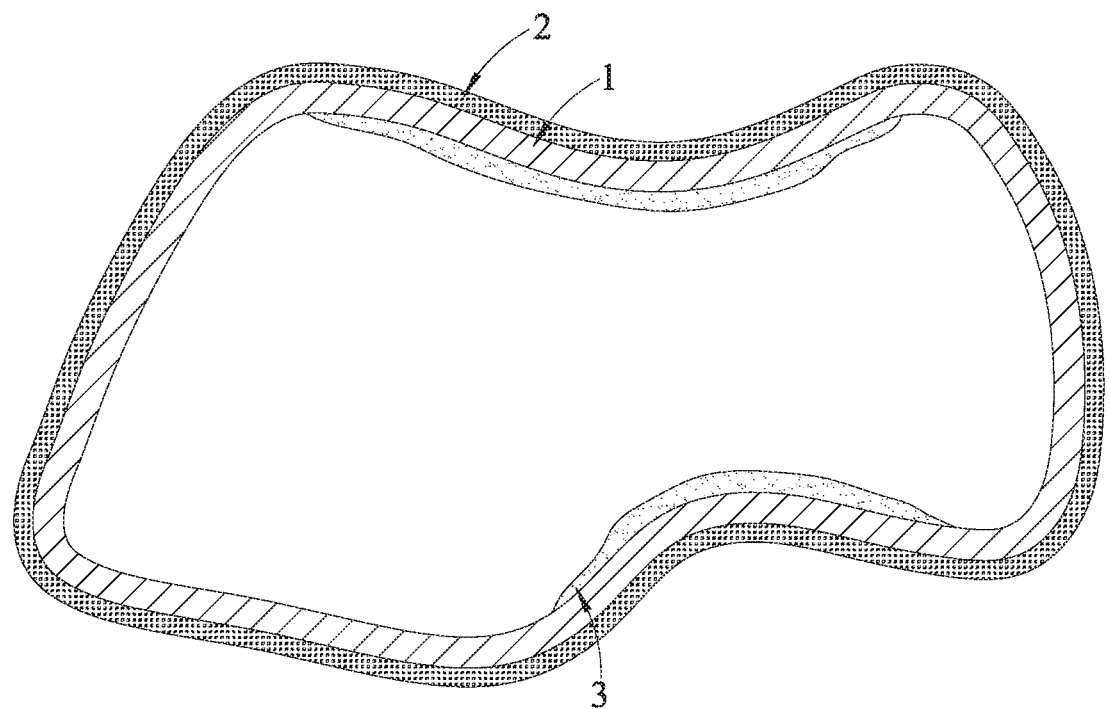
FIG. 1 is a cross-sectional view showing an inner wall compensation quantity of a thin shell mold in accordance with the preferred embodiment of the present invention.
Figure 2:
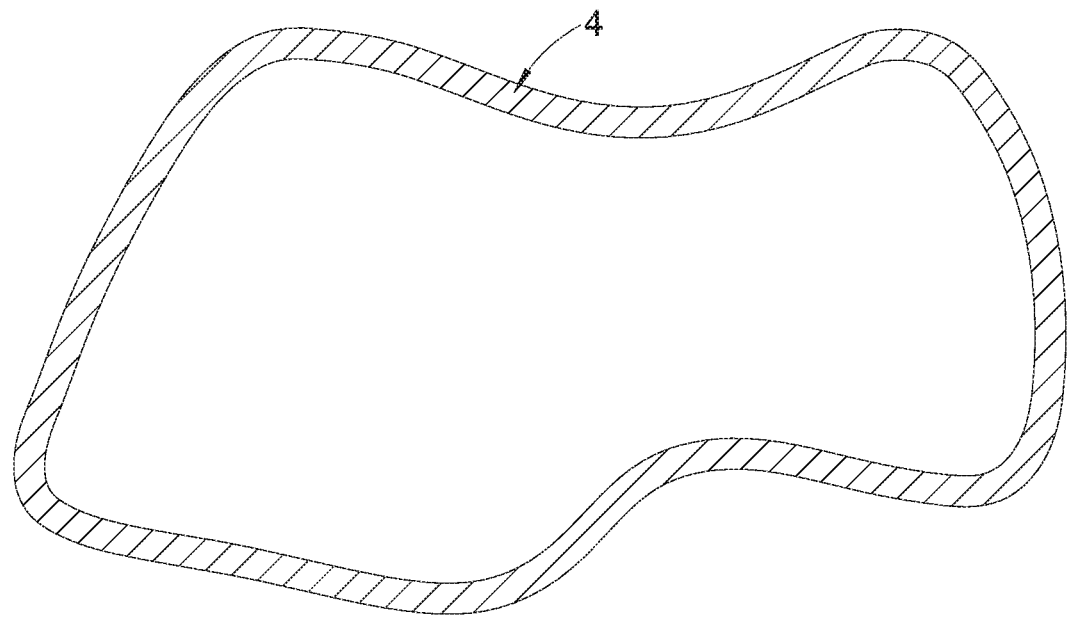
FIG. 2 is a cross-sectional view showing a product in accordance with the preferred embodiment of the present invention.

Referring to FIGS. 1 and 2, a casting method in accordance with the preferred embodiment of the present invention comprises a first step of constructing a 3D (three-dimensional) model by a calculator and analyzing the 3D model by a finite element analysis to add an inner wall compensation quantity 2, a second step of inputting data of the 3D model calculated by the calculator into a 3D printing machine which performs a printing work on a workpiece to be printed (or printing material) to make a thin shell mold 1, a third step of individually treating an outer surface of the thin shell mold 1 by smooth processing, a fourth step of processing the thin shell mold 1 by multi-layer impregnation slurry or gunite to make an outer shell mold 3, and to form a double-layer shell mold which includes the thin shell mold 1 and the outer shell mold 3, a fifth step of placing the double-layer shell mold into a sand box and processing the double-layer shell mold by sand filling and compressing, a sixth step of clearing the thin shell mold 1 of the double-layer shell mold in the sand box by a physical or chemical process, a seventh step of casting the outer shell mold 3 of the double-layer shell mold in the sand box to form a shaped article, and an eighth step of post processing the shaped article by shaking and sand clearing to form a product 4.

In the first step, figures or photographs of the product 4 are inputted into the calculator to build the 3D model. The inner wall compensation quantity 2 is a compensation amount of the inner wall of the product 4 due to thermal expansion and contraction to enhance the connecting strength of the whole structure which includes the thin shell mold 1, the inner wall compensation quantity 2, the outer shell mold 3 and the product 4. The thin shell mold 1 has an irregular profile and has an interior provided with a cavity in which a support rack is received. The support rack is used to support the thin shell mold 1 during the printing process. Thus, the 3D model is analyzed by the finite element analysis to gradually change the structural strength of the thin shell mold 1 by a leverage principle, to facilitate operation of the fourth and sixth steps.

In the second step, the 3D printing machine is specially designed for the thin shell mold 1. The thin shell mold 1 is printed by the 3D printing machine in a layer by layer stacking manner. The inner wall compensation quantity 2 and the cavity of the thin shell mold 1 are integrated during the printing process.

In the third step, the outer surface of the thin shell mold 1 is treated by smooth processing to facilitate operation of the fourth step. In practice, the thin shell mold 1 is stacked layer by layer after the thin shell mold 1 is printed, so that the outer surface of the thin shell mold 1 has a corrugated shape under the microscopic observation and will affect forming of the inner wall of the outer shell mold 3. Thus, the sharp portions at the outer surface of the thin shell mold 1 are chamfered by softening at a high temperature to facilitate operation of the fourth step.

In the fourth step, the procedure of impregnation slurry is a precision casting craft to make the outer shell mold 3 that endures a high temperature. In practice, the thin shell mold 1 is initially washed and dried. Then, the thin shell mold 1 is immersed into zirconium slurry, and sprayed with zirconium sand, thereby forming a first layer. Then, the thin shell mold 1 is dried. Then, the thin shell mold 1 is processed by the same or different slurry, thereby forming a second layer. The above procedures are repeated so that the thin shell mold 1 is processed to form the outer shell mold 3 with a multilayer structure. Finally, the outer shell mold 3 is immersed in the slurry, and the slurry is sealed. Thus, the outer shell mold 3 endures a high temperature. Preferably, the slurry includes zirconium slurry, mullite slurry, zirconium sand and mullite sand. Specifically, the zirconium slurry is a mixture of silicone, zirconium powder, penetrant and defoamer, and the mullite slurry is a mixture of silicone, mullite powder, penetrant and defoamer. Preferably, the outer shell mold 3 has a thickness of about 1-3 mm.

In the fifth step, the outer shell mold 3 cannot directly bear the thermal expansion and contraction of the thin shell mold 1, so that when the thin shell mold 1 is vaporized, liquefied or powdered at a high temperature, the outer shell mold 3 will be broken. Thus, it is necessary to treat the double-layer shell mold by sand filling and compressing. In practice, the double-layer shell mold is placed into the sand box, with the sprue (or gate) of the double-layer shell mold facing upward. Then, fine sands are filled into the sand box. Then, the sand box is shaken to make the sands compact. Preferably, a cover is mounted on the sand box and presses the sands to make the sands more compact. The cover is provided with a hole aligning with the sprue of the double-layer shell mold. The sprue of the double-layer shell mold protrudes from the hole of the cover and is higher than the cover about 1 cm. The sand includes zirconium sand, mullite sand, silicon sand, iron sand, copper sand, aluminum sand or the like and has a circular shape, polygonal shape or the like.

In the sixth step, the physical process includes clearing the thin shell mold 1 by vaporizing, liquefying or powdering at a high temperature, and the chemical process includes dissolving the thin shell mold 1 by a solvent. The solvent includes an organic solvent, such as toluene or the like.

Alternatively, the fifth step and the sixth step are interchanged, that is, the thin shell mold 1 is cleared by a physical or chemical process, and the double-layer shell mold is then processed by sand filling and compressing. In practice, the thin shell mold 1 is cleared by vaporizing, liquefying or powdering at a high temperature. Then, the double-layer shell mold is placed into the sand box, and is processed by sand filling and compressing. Then, the outer shell mold 3 of the double-layer shell mold is cast under a normal pressure, a vacuum state or a negative pressure to form a cast (or the shaped article). Finally, the cast is removed from the outer shell mold 3 to form the product 4.

In the eighth step, the outer shell mold 3 is separated from the product 4 by shaking, and the sands attached to the product 4 in the sand box is cleared and removed by sand clearing.

According to the preferred embodiment of the present invention, in the second step, the 3D printing machine is an LCD photocurable printer, an FDM printer, a DLP photocurable printer or an SLA photocurable printer, and the printing material is plastics, a resin wax, a photosensitive resin, resin ceramics, a photocurable resin or a photocurable ceramic resin. Preferably, the 3D printing machine and the printing material include an LCD photocurable printer and a photocurable resin, an FDM printer and plastics, a DLP photocurable printer and a photocurable ceramic resin, or an SLA photocurable printer and a resin wax.

In the preferred embodiment of the present invention, the third step includes removing a support rack secured on the 3D printing machine to ensure that the thin shell mold 1 is an individual before the smooth processing. Thus, when the surface of the thin shell mold 1 is softened at a high temperature, the support rack will not in contact with the surface of the thin shell mold 1.

According to the preferred embodiment of the present invention, in the third step, the smooth processing includes ultrasonic washing and/or ultraviolet irradiating.

In the preferred embodiment of the present invention, the sixth step includes placing the sand box with a cover into a boiler with a ventilating system, rotating the sand box through 360°, reversely rotating the sand box through 360°, increasing the temperature of the boiler at a rate of 300° C. per hour until the temperature reaches 700° C., and keeping the temperature of 700° C. during one hour (1 hr) until the thin shell mold 1 is vaporized completely.

In another preferred embodiment of the present invention, the sixth step includes filling a toluene solution through a sprue into the thin shell mold 1, keeping the toluene solution during four hours (4 hr) until the thin shell mold 1 is decomposed completely into a liquid, and clearing the liquid in the outer shell mold 3.

In the preferred embodiment of the present invention, the sixth step includes placing the sand box with the double-layer shell mold into a boiler with a ventilating system, with the sprue facing upward, increasing the temperature of the boiler at a rate of 50° C. to 400° C. per hour until the temperature reaches 150° C. to 1000° C., keeping the temperature of 150° C. to 1000° C. during thirty minutes to one hour (30 min-1 hr) to break an integrity of the thin shell mold 1, decreasing the temperature of the boiler to a room temperature, and clearing impurities in the outer shell mold 3.

In the preferred embodiment of the present invention, the thin shell mold 1 has a thickness smaller than or equal to 2 mm.

According to the preferred embodiment of the present invention, in the seventh step, when the casting process proceeds in the atmospheric environment, the sand box is placed into a boiler at the temperature of 1000° C. The sand box is heated during a period of time, and is removed from the boiler. Then, melted raw material is poured from the sprue to perform the casting process. Alternatively, the sand box is placed into a closed boiler to perform the casting process in the closed boiler.

The casting method in accordance with the first preferred embodiment of the present invention comprises the following steps.

The first step includes constructing a 3D model to contain the thin shell mold 1 of 1 mm thickness and the inner wall compensation quantity 2.

The second step includes printing the thin shell mold 1 by using an LCD photocurable printer and a photocurable resin.

The third step includes removing the support rack of the thin shell mold 1, then processing the thin shell mold 1 by ultrasonic washing, and then processing the thin shell mold 1 by ultraviolet (UV) irradiating. The UV irradiating time is the same as the printing time.

The fourth step includes making the outer shell mold 3 with three layers. The first layer includes zirconium slurry and zirconium sand, the second layer includes zirconium slurry and zirconium sand, and the third layer includes mullite slurry and mullite fine sand. The sealing slurry includes mullite slurry.

The fifth step includes placing the double-layer shell mold into a sand box to perform sand filling and compressing. The sand box is added with a cover, and the sprue protrudes from the cover about one centimeter (1 cm).

The sixth step includes placing the sand box with a cover into a boiler with a ventilating system, rotating the sand box through 360°, reversely rotating the sand box through 360°, increasing the temperature of the boiler at a rate of 300° C. per hour until the temperature reaches 700° C., and keeping the temperature of 700° C. during one hour (1 hr) until the thin shell mold 1 is vaporized completely.

The seventh step includes casting the outer shell mold 3 in the sand box to form a shaped article.

The eighth step includes processing the shaped article to form a product 4.

The casting method in accordance with the second preferred embodiment of the present invention comprises the following steps.

The first step includes constructing a 3D model to contain the thin shell mold 1 of 1.5 mm thickness and the inner wall compensation quantity 2.

The second step includes printing the thin shell mold 1 by using an FDM printer and plastics.

The third step includes removing the support rack of the thin shell mold 1.

The fourth step includes making the outer shell mold 3 with two layers. The first layer includes zirconium slurry and zirconium sand and the second layer includes mullite slurry and mullite fine sand. The sealing slurry includes mullite slurry.

The fifth step includes placing the double-layer shell mold into a sand box to perform sand filling and compressing.

The sixth step includes placing the sand box with the double-layer shell mold into a boiler with a ventilating system, with the sprue facing upward, increasing the temperature of the boiler at a rate of 400° C. per hour until the temperature reaches 1000° C., and keeping the temperature of 1000° C. during one hour (1 hr) until the thin shell mold 1 is vaporized completely.

The seventh step includes casting the outer shell mold 3 in the sand box to form a shaped article.

The eighth step includes processing the shaped article to form a product 4.

The casting method in accordance with the third preferred embodiment of the present invention comprises the following steps.

The first step includes constructing a 3D model to contain the thin shell mold 1 of 1 mm thickness and the inner wall compensation quantity 2.

The second step includes printing the thin shell mold 1 by using a DLP photocurable printer and a photocurable ceramic resin.

The third step includes processing the thin shell mold 1 by ultrasonic washing, and then processing the thin shell mold 1 by ultraviolet (UV) irradiating. The UV irradiating time is the same as the printing time.

The fourth step includes making the outer shell mold 3 with two layers. The first layer includes zirconium slurry and zirconium sand and the second layer includes zirconium slurry and zirconium sand. The sealing slurry includes mullite slurry.

The fifth step includes placing the double-layer shell mold into a sand box to perform sand filling and compressing.

The sixth step includes placing the sand box with the double-layer shell mold into a boiler with a ventilating system, with the sprue facing upward, increasing the temperature of the boiler at a rate of 50° C. per hour until the temperature reaches 700° C., keeping the temperature of 700° C. during one hour (1 hr) until the thin shell mold 1 is powdered, decreasing the temperature of the boiler to a room temperature, and clearing impurities in the outer shell mold 3.

The seventh step includes casting the outer shell mold 3 in the sand box to form a shaped article.

The eighth step includes processing the shaped article to form a product 4.

The casting method in accordance with the fourth preferred embodiment of the present invention comprises the following steps.

The first step includes constructing a 3D model to contain the thin shell mold 1 of 2 mm thickness and the inner wall compensation quantity 2.

The second step includes printing the thin shell mold 1 by using an SLA photocurable printer and a resin wax.

The third step includes processing the thin shell mold 1 by ultrasonic washing, and then processing the thin shell mold 1 by ultraviolet (UV) irradiating. The UV irradiating time is the same as the printing time.

The fourth step includes making the outer shell mold 3 with three layers. The first layer includes zirconium slurry and zirconium sand, the second layer includes mullite slurry and mullite fine sand, and the third layer includes mullite slurry and mullite rough sand. The sealing slurry includes mullite slurry.

The fifth step includes placing the double-layer shell mold into a boiler with a ventilating system, with the sprue facing downward, increasing the temperature at a rate of 200° C. per hour until the temperature reaches 150° C., keeping the temperature of 150° C. during thirty minutes (30 min) until the thin shell mold 1 is liquefied and flows outward.

The sixth step includes placing the outer shell mold 3 of the double-layer shell mold into a sand box to perform sand filling and compressing.

The seventh step includes casting the outer shell mold 3 in the sand box to form a shaped article.

The eighth step includes processing the shaped article to form a product 4.

The casting method in accordance with the fifth preferred embodiment of the present invention comprises the following steps.

The first step includes constructing a 3D model to contain the thin shell mold 1 of 1 mm thickness and the inner wall compensation quantity 2.

The second step includes printing the thin shell mold 1 by using an FDM printer and plastics.

The third step includes removing the support rack of the thin shell mold 1.

The fourth step includes making the outer shell mold 3 with two layers. The first layer includes zirconium slurry and zirconium sand and the second layer includes mullite slurry and mullite sand. The sealing slurry includes mullite slurry.

The fifth step includes filling a toluene solution through a sprue into the thin shell mold 1, keeping the toluene solution during four hours (4 hr) until the thin shell mold 1 is decomposed completely, and clearing the toluene solution in the outer shell mold 3.

The sixth step includes placing the outer shell mold 3 of the double-layer shell mold into a sand box to perform sand filling and compressing.

The seventh step includes casting the outer shell mold 3 in the sand box to form a shaped article.

The eighth step includes processing the shaped article to form a product 4.

Accordingly, the thin shell mold 1 is made by a 3D printing machine to standardize the production, and to enhance the connecting structure of the thin shell mold 1, thereby facilitating operation of multi-layer impregnation slurry or gunite and operation of removing the thin shell mold 1. In addition, the outer shell mold 3 has a small thickness to decrease the strength for shaking and sand clearing of the shaped article, thereby reducing the pollution, and thereby enhancing the productivity.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A casting method comprising:
    a first step of constructing a 3D (three-dimensional) model by a calculator and analyzing the 3D model by a finite element analysis to add an inner wall compensation quantity;
    a second step of inputting data of the 3D model calculated by the calculator into a 3D printing machine which performs a printing work on a printing material to make a thin shell mold;
    a third step of individually treating an outer surface of the thin shell mold by smooth processing;
    a fourth step of processing the thin shell mold by multi-layer impregnation slurry or gunite to make an outer shell mold, and to form a double-layer shell mold which includes the thin shell mold and the outer shell mold;
    a fifth step of placing the double-layer shell mold into a sand box and processing the double-layer shell mold by sand filling and compressing;
    a sixth step of clearing the thin shell mold of the double-layer shell mold in the sand box by a physical or chemical process;
    a seventh step of casting the outer shell mold of the double-layer shell mold in the sand box to form a shaped article; and
    an eighth step of post processing the shaped article by shaking and sand clearing to form a product, wherein the sixth step includes placing the sand box with a cover into a boiler with a ventilating system, rotating the sand box through 360°, reversely rotating the sand box through 360°, increasing the temperature of the boiler at a rate of 300° C. per hour until the temperature reaches 700° C., and keeping the temperature of 700° C. during one hour (1 hr) until the thin shell mold is vaporized completely.

2. The casting method of claim 1, wherein the 3D printing machine and the printing material include an LCD photocurable printer and a photocurable resin, an FDM printer and plastics, a DLP photocurable printer and a photocurable ceramic resin, or an SLA photocurable printer and a resin wax.

3. The casting method of claim 1, wherein the third step includes removing a support rack secured on the 3D printing machine to ensure that the thin shell mold is an individual before the smooth processing.

4. The casting method of claim 1, wherein in the third step, the smooth processing includes ultrasonic washing and/or ultraviolet irradiating.

5. The casting method of claim 1, wherein the thin shell mold has a thickness smaller than or equal to 2 mm.

* * * * *